United States Patent [19]

Guelen et al.

[11] Patent Number: 4,786,486

[45] Date of Patent: Nov. 22, 1988

[54] STABILIZED ZIRCONIA PARTICULATES

[75] Inventors: Jean-Claude Guelen, Clamecy; Jean-Francois Colombet, Rueil Malmaison; Claude Magnier, Paris; Jean-Philippe Browaeys, Paris; Alain Vesco, Paris, all of France

[73] Assignee: Thann et Mulhouse, Thann, France

[21] Appl. No.: 26,185

[22] Filed: Mar. 16, 1987

[30] Foreign Application Priority Data

Mar. 14, 1986 [FR] France ............................. 86 03654

[51] Int. Cl.$^4$ ............................................. C01G 25/00
[52] U.S. Cl. ....................................... 423/275; 423/608
[58] Field of Search ................. 423/69, 266, 265, 608, 423/274, 275, 467

[56] References Cited

U.S. PATENT DOCUMENTS

| | | | |
|---|---|---|---|
| 3,514,252 | 5/1970 | Levy, Jr. et al. | 423/275 |
| 3,672,825 | 6/1972 | Gambale et al. | 423/467 |
| 4,605,631 | 8/1986 | Rossi | 423/608 |
| 4,639,356 | 1/1987 | O'Toole et al. | 423/266 |
| 4,664,894 | 5/1987 | Suzuki et al. | 423/265 |

FOREIGN PATENT DOCUMENTS

| | | | |
|---|---|---|---|
| 0111922 | 6/1984 | Japan | 423/608 |
| 36330 | 2/1985 | Japan | 423/608 |
| 0127240 | 7/1985 | Japan | 423/608 |

Primary Examiner—John Doll
Assistant Examiner—Jeffrey Edwin Russel
Attorney, Agent, or Firm—Burns, Doane, Swecker & Mathis

[57] ABSTRACT

Submicronic zirconia particulates containing stabilizing amounts of yttrium or cerium, well adapted for ceramics applications, are produced by (i) admixing an aqueous suspension of zirconium fluosulfate particles having a pH of from about 0 to 3 with an aqueous solution of a salt of yttrium or cerium, (ii) neutralizing the resulting mixture at a pH of at least 7, (iii) separating a mixture of zirconium/yttrium or zirconium/cerium hydroxides from the medium of neutralization, (iv) washing said mixture of hydroxides to eliminate sulfate and fluoride ions therefrom, and then (v) calcining said mixture of hydroxides.

18 Claims, No Drawings

STABILIZED ZIRCONIA PARTICULATES

BACKGROUND OF THE INVENTION

1. Field of the Invention

The present invention relates to the preparation of submicronic zirconia stabilized with effective amounts of yttrium or cerium, and, more especially, to the preparation of such stabilized zirconia from zirconium fluosulfate, and use thereof in a variety of ceramic compositions.

2. Description of the Prior Art

It is known to this art (for example, from published Japanese application No. 57/191234) to prepare, e.g., yttrium-stabilized zirconia by neutralization of admixture of an aqueous solution of a pure salt of zirconium (oxychloride, nitrate, and the like) and an aqueous solution of a salt of yttrium (e.g., chloride, nitrate). Such process, however, is limited to the use of the water soluble zirconium salts.

SUMMARY OF THE INVENTION

Accordingly, a major object of the present invention is the provision of an improved process for the preparation of stabilized zirconia from zirconium salts, wherein the starting zirconium salts need not be soluble in water and, indeed, are water insoluble.

Briefly, the present invention features the preparation of stabilized zirconia by calcination of a mixture of zirconium hydroxide and a hydroxide of one of the stabilizing elements yttrium or cerium, followed by the grinding and optional screening of the stabilizing zirconia thus obtained, said process being characterized in that the mixture of the hydroxides of zirconium and the stabilizing element is produced by:

(1) neutralizing, either with ammonia, or an alkaline hydroxide having a pH of at least 7, and preferably at least 10, a mixture which comprises:

(i) an aqueous suspension of zirconium fluosulfate particles containing 5 to 35% by weight Zr, preferably 20 to 30% by weight, expressed as $ZrO_2$, the pH of said suspension ranging from about 0 to 3, and (ii) an aqueous solution of a salt of a stabilizing element containing 5 to 20% by weight, preferably 10 to 15% by weight, of the stabilizing element, expressed in terms of the oxide thereof, with the relative amounts of the aqueous suspension of zirconium fluosulfate and the aqueous solution of the stabilizing element corresponding to a molar ratio of the oxide of the stabilizing element/$ZrO_2$ on the order of 1/100 to 20/100;

(2) separating the mixture of hydroxides thus produced by filtration, followed by washing with water, to which ammonia or an alkaline hydroxide may have been added, at a pH in the vicinity of that of the neutralization, and then by refiltration; and (3) optionally washing the mixture of hydroxides produced in step (2) at least once, by suspending said mixture of hydroxides in an aqueous solution of nitric or hydrochloric acid, wherein the pH of the suspension must be higher than the conditions of pH existing upon dissolution of the hydroxide of the stabilizing element, but not exceeding 8, followed by at least one filtration.

DETAILED DESCRIPTION OF THE PREFERRED EMBODIMENTS OF THE INVENTION

More particularly according to the present invention, by the expression "zirconium fluosulfate" is intended any amorphous hydrate of the general formula $ZrF_x(SO_4)_y(OH)_z$, wherein x ranges from 0.1 to 1, y ranges from 0.1 to 1, and z ranges from 1 to 3.7, with the proviso that x and y cannot at the same time both be equal to 1. Preferably, a zirconium fluosulfate is selected wherein x is on the order of 0.5, y is on the order of 0.5 and z is on the order of 1.5, said fluosulfate optionally being prepared by the process described in French Patent No. 1,375,076 or in U.S. Pat. No. 3,672,825, by decomposition of a zirconium silicate (zircon) mineral utilizing sodium carbonate, followed by dissolution of the sodium silicozirconate thus obtained in hydrochloric acid, addition of sodium sulfate and hydrofluoric acid or sodium fluosilicate thereto, hydrolysis of the solution which results, at 60° C., to precipitate the zirconium fluosulfate formed, and separation of such values by filtration.

The zirconium fluosulfate particles used advantageously have an average grain size on the order of 3 to 10 $\mu$m.

The neutralization stage may advantageously be carried out at a temperature on the order of 20° to 100° C., preferably on the order of 20° to 40° C.

To provide a stabilized zirconia having particularly desirable mechanical properties, a molar ratio $Y_2O_3$/$ZrO_2$ on the order of 1/100 to 10/100, preferably on the order of 2/100 to 6/100, is used, if the stabilizing element is yttrium, or a molar ratio $CeO_2/ZrO_2$ on the order of 5/100 to 20/100, preferably on the order of 8/100 to 15/100, if the stabilizing element is cerium.

Among the salts of the stabilizing elements that are applicable, the use of yttrium nitrate is particularly advantageous.

Exemplary of the neutralizing bases that may be used, ammonia and sodium hydroxide are preferred; the neutralization stage is preferably carried out at a pH of at least 10, if the neutralizing base is ammonia, and at a pH of 13, if the neutralizing base is sodium hydroxide.

The subsequent washing stage is carried out at a temperature of from 20° to 100° C., preferably on the order of 20° to 40° C.; it is conducted at the same pH as that attained upon completion of the neutralization in order to eliminate the sulfate ions and a fraction of the fluoride ions desorbed during neutralization.

The optional washing stage with nitric or hydrochloric acid is intended to eliminate the alkaline or ammonium ions adsorbed by the hydroxide mixture. It may be carried out at a temperature on the order of 20° to 100° C., typically on the order of 20° C.

It is carried out at a pH which is a function of the nature of the stabilizing element. Thus, if the latter is yttrium, a pH of 7 to 8 is preferred. If it is cerium, the pH may range from 3 to 8.

In a preferred embodiment of the invention, the neutralization stage is carried out using ammonia at a pH of about 10.5; the subsequent wash stage is conducted at the same pH using an ammonia solution. After filtration, the hydroxide mixture thus produced is washed at a pH of about 7.5 with nitric or hydrochloric acid.

The mixture of hydroxides obtained after neutralization, basic wash and optional washing with an acid, is subsequently calcined, after filtering, at a temperature on the order of 600° to 1,300° C., preferably on the order of 900° to 1,200° C., such temperature being a function of the pH of neutralization. Thus, for neutralization pH values less than or equal to 10, a temperature of at least 1,150° C. is preferred; for higher pH values, the temperature may range from 900° to 1,100° C.

The duration of this operation may range from 15 min to 12 hr; typically, it is on the order of 1 hr to 6 hr.

The stabilized zirconia powder produced in this manner then has an average particle or grain size of 3 to 10 μm.

Regardless of the nature of the stabilizing element, radiocrystallographic analysis evidences that the final product is a solid solution.

It is subsequently ground in a humid environment by known methods, for example, in a microball grinder (microballs having an approximate diameter of 1 mm) to produce, after drying and screening, a powder having an average grain size on the order of 0.15 to 1 μm, characterized by elementary crystals having a dimension on the order of 200 to 1,200 Å and typically on the order of 300 to 600 Å. Its specific surface varies from 50 to 3 $m^2/g$.

The properties of the stabilized powder are determined in the following manner:

The stabilized zirconia powder is mixed with a binder in a proportion by weight on the order of 2%, said binder being selected from among those well known for this type of operation, such as polyvinyl alcohol (RHODOVIOL 4/20 marketed by Rhone-Poulenc).

Measurement of density:

The mixture is pelleted under a pressure of 1 to 4 $T/cm^2$. This is followed by sintering with a speed of increase in temperature of 5° C./min; when the sintering temperature is attained, which ranges from 1,300° to 1,600° C., the material is permitted to stand for 3 hr at this temperature and then cooled. In this manner, a stabilized zirconia ceramic is produced, the density of which is at least 97% of the theoretical density of the subject stabilized zirconia.

Measurement of bending strength:

The fired piece is cut using a diamond saw into parallelepipedic specimens having the dimensions 40 mm×3 mm×4 mm.

The 3-point bending test (the distance between the end supports is 30 mm, and the speed of displacement of the press is 0.5 mm/min) is carried out on ten specimens.

The values obtained depend upon the type and the amount of stabilizer present.

Thus, for a stabilized zirconia powder with 3 molar % $Y_2O_3$, the bending strength ranges from about 600 to 800 Mpa.

The stabilized zirconia powder produced according to the invention may be used to prepare ceramics having good mechanical, thermodynamic and electrical properties, and may be used for the production of supports and crucibles destined for elevated temperature applications, oxygen probes, wear or adiabatization parts for heat engines, or tools.

In order to further illustrate the present invention and the advantages thereof, the following specific examples are given, it being understood that same are intended only as illustrative and in nowise limitative.

EXAMPLE 1

40 g of an aqueous solution of yttrium nitrate, containing 13.5% by weight of yttrium expressed as $Y_2O_3$, were introduced into 530 g of an aqueous suspension of zirconium fluosulfate having a pH of 2 and the general formula $ZrF_{0.5}(SO_4)_{0.5}(OH)_{1.5}$, said suspension containing 17.8% by weight of zirconium, expressed as $ZrO_2$.

The acid mixture thus obtained was vigorously agitated and neutralized over 15 min using a 10N aqueous solution of ammonia, to adjust the pH to 10.5.

This filtration/resuspension stage in ammonia at pH 10.5 was repeated several times until all of the sulfate ions disappeared from the wash waters.

Following desorption of the sulfate ions, the filtered gel was resuspended in 1,000 $cm^3$ deionized water, then refiltered and finally resuspended in 1,000 $cm^3$ water, to which 2 N nitric acid was added to adjust the pH to 7.5.

The suspension was then filtered, washed with 1,000 $cm^3$ deionized water and refiltered.

In this manner, 250 g of a moist mixture of zirconium hydroxide and yttrium hydroxide was obtained, which was subsequently calcined at 1,150° C. for 5 hr, utilizing an increase in temperature of 10° C per min.

100 g of a yttrium-stabilized zirconia powder were obtained, which was crystallized in the quadratic form, characteristic of the $ZrO_2/3\%$ $Y_2O_3$ solid solution.

This powder was placed in suspension in deionized water containing 0.5% by weight of isopropanol; this suspension, which contained 600 g/l oxide, was then ground in a microball grinder until an average grain size of 0.5 μm was obtained, with the specific surface then being 8 $m^2/g$.

This powder was mixed with 2% by weight of polyvinyl alcohol, exposed to flash drying, then compacted under a pressure of 3 $T/cm^2$. The raw density of the compacted shaped article was equal to 54% of the theoretical density.

After sintering at 1,450° C. for 3 hr, the density of the ceramic produced was 5.95, i.e., 97.5% of the theoretical density.

The bending strength of this material, measured on ten specimens as described above, was 750 MPa on average.

EXAMPLE 2

The operations described in Example 1 were repeated, except that the calcination was carried out at 1,050° C. for 5 hr, instead of 1,150° C., with the powder obtained after grinding having an average grain size of 0.5 μm and a specific surface of 12 $m^2/g$.

Properties of the product:
 (a) Raw density: 52% of theoretical density;
 (b) Density after sintering: 97.2% of theoretical density;
 (c) Average value of bending strength: 720 MPa.

EXAMPLE 3

A mixture of an acid solution of yttrium nitrate and a suspension of zirconium fluosulfate was prepared as in Example 1 and was neutralized with a 10N aqueous solution of ammonia until a pH of 10.5 was attained.

The mixture was filtered, then resuspended in 1,000 $cm^3$ deionized water.

This filtration/resuspension in water stage was repeated several times until the sulfate ions disappeared from the wash water.

250 g of moist mixture of zirconium hydroxide and yttrium hydroxide were recovered by filtration, said mixture then being calcined at 1,150° C. for 5 hr.

The resulting powder was ground (average grain size 0.5 μm, specific surface 7 $m^2/g$), compacted and sintered as in Example 1.

Properties of the product:
 (a) Raw density: 56% of theoretical density;

(b) Density after sintering: 97% of theoretical density;
(c) Average value of bending strength: 700 MPa.

EXAMPLE 4

A mixture of an acid solution of yttrium nitrate and a suspension of zirconium fluosulfate was prepared as in Example 1, then neutralized with a 3.5N aqueous solution of sodium hydroxide until a pH of 13.5 was attained.

After filtration, the precipitate was suspended in 1,000 cm$^3$ of an aqueous sodium hydroxide solution at pH 13.5.

The mixture was filtered, then resuspended in 1,000 cm$^3$ of deionized water.

This filtration/resuspension stage in water was repeated twice.

After filtering, the cake was resuspended in 1,000 cm$^3$ water, to which 2N nitric acid was added until a pH of 7.5 was attained.

The mixture was filtered, then resuspended in water at pH 7.5; this filtering/resuspension in water was carried out until the total desorption (less than 50 ppm Na$_2$O) of sodium ions adsorbed during neutralization was realized.

After filtration, 250 g of a moist mixture of zirconium hydroxide and yttrium hydroxide were obtained, said mixture then being calcined at 1,000° C. for 3 hr.

The resulting powder was then ground (average grain size 0.5 μm, specific surface 14 m$^2$/g), compacted and sintered as in Example 1.

Properties of the product:
(a) Raw density: 55% of theoretical density;
(b) Density after sintering: 97.5% of theoretical density;
(c) Average value of bending strength: 650 MPa.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of zirconia particulates containing a stabilizing amount of yttrium or cerium, which comprises (i) admixing an aqueous suspension of zirconium fluosulfate particles having a pH of from about 0 to 3 with an aqueous solution of a salt of yttrium or cerium, (ii) neutralizing the resulting mixture at a pH of at least 7, (iii) separating a mixture of zirconium and yttrium or zirconium and cerium hydroxides from the medium of neutralization, (iv) washing said mixture of hydroxides to eliminate sulfate and fluoride ions therefrom, and then (v) calcining said mixture of hydroxides.

2. The process as defined by claim 1, said aqueous suspension of zirconium fluosulfate particles comprising from about 5 to 35% by weight of zirconium, expressed as ZrO$_2$, said aqueous solution comprising from about 5 to 20% by weight of yttrium, or cerium, expressed as the oxide thereof, and wherein the molar ratio of such oxide of yttrium or cerium/ZrO$_2$ ranges from about 1/100 to 20/100.

3. The process as defined by claim 2, wherein said neutralization (ii) is accomplished with ammonia or an alkali metal hydroxide.

4. The process as defined by claim 3, wherein said neutralization (ii) is accomplished with ammonia, at a pH of at least 10.

5. The process as defined by claim 3, wherein said neutralization (ii) is accomplished with an alkali metal hydroxide, at a pH of about 13.

6. The process as defined by claim 2, said zirconium fluosulfate particles having an average grain size of from about 3 to 10 μm.

7. The process as defined by claim 2, said aqueous solution comprising a salt of yttrium, and the molar ratio Y$_2$O$_3$/ZrO$_2$ ranging from about 1/100 to 10/100.

8. The process as defined by claim 7, said molar ratio Y$_2$O$_3$/ZrO$_2$ ranging from about 2/100 to 6/100.

9. The process as defined by claim 2, said aqueous solution comprising a salt of cerium, and the molar ratio CeO$_2$/ZrO$_2$ ranging from about 5/100 to 20/100.

10. The process as defined by claim 9, said molar ratio CeO$_2$/ZrO$_2$ ranging from about 8/100 to 15/100.

11. The process as defined by claim 7, said aqueous solution comprising yttrium nitrate.

12. The process as defined in claim 2, wherein said washing (iv) is carried out at a pH of about the pH of neutralization.

13. The process as defined by claim 12, wherein said washing (iv) is accomplished with water containing either ammonia or an alkali metal hydroxide.

14. The process as defined by claim 2, further comprising, prior to the calcination (v), rewashing the mixture of hydroxides at least once, by suspending same in an aqueous acid solution, the suspension which results having a pH of up to 8.

15. The process as defined by claim 14, the suspension which results having a pH of from 7 to 8.

16. The process as defined by claim 14, the suspension which results having a pH of from 3 to 8.

17. The process as defined by claim 2, further comprising (vi) grinding the stabilized zirconia particulates thus produced.

18. The process as defined by claim 17, said ground particulates having an average grain size of from about 3 to 10 μm.

* * * * *